United States Patent [19]

Yamano et al.

[11] Patent Number: 4,750,102
[45] Date of Patent: Jun. 7, 1988

[54] POWER CONVERTING APPARATUS

[75] Inventors: Masaru Yamano, Hirakata; Kazuyoshi Tsukamoto, Osaka; Kazufumi Ushijima, Hirakata, all of Japan

[73] Assignee: Sanyo Electric Co., Ltd., Japan

[21] Appl. No.: 25,341

[22] Filed: Mar. 13, 1987

[30] Foreign Application Priority Data

Mar. 20, 1986 [JP] Japan .................................. 61-63183
Mar. 20, 1986 [JP] Japan .................................. 61-63184

[51] Int. Cl.4 .............................................. H02M 1/10
[52] U.S. Cl. ..................................... 363/142; 323/906
[58] Field of Search ......................... 363/142; 323/906

[56] References Cited

U.S. PATENT DOCUMENTS

| | | | |
|---|---|---|---|
| 4,390,940 | 6/1983 | Corbefin et al. | 323/906 |
| 4,404,472 | 9/1983 | Steigerwald | 323/906 |
| 4,445,049 | 4/1984 | Steigerwald | 323/906 |
| 4,626,983 | 12/1986 | Harada et al. | 323/906 |

FOREIGN PATENT DOCUMENTS 3142168  5/1982  Fed. Rep. of Germany ...... 323/906

OTHER PUBLICATIONS

Roesler; Dietrich J., A 60kw Solar Power System, IEEE Photovoltaic Specialists Conference, Jun. 1978, pp. 978-983.
Lambarshi; Timothy J. et al., A Power Conditioning System, IEEE Photovoltaic Specialists Conference, Jan. 1980, pp. 121-124.

Primary Examiner—Patrick R. Salce
Assistant Examiner—Judson H. Jones
Attorney, Agent, or Firm—Darby & Darby

[57] ABSTRACT

A power converting apparatus comprising intermediate DC power which rectifies AC from a commercial power to output DC, a solar array connected in parallel to the intermediate DC power, an inverter which converts DC inputted respectively from the intermediate DC power and the solar array into AC having the variable frequency and the variable voltage, then supply its AC output to a load, and circuit networks for power regeneration which regenerates a surplus power of the solar array into the commercial power, when the generated voltage of the solar array exceeds the prescribed voltage.

5 Claims, 8 Drawing Sheets

POWER CONVERTING APPARATUS

FIELD OF THE INVENTION AND RELATED ART STATEMENT

The present invention relates to a power converting apparatus designed to operate an AC motor used in an air conditioner and the like at a variable speed by a DC-AC inverting means.

A related technique of the power converting apparatus including the DC-AC inverting means is set forth, for example, in Japanese Patent Publication No. 52635/84, in which a device consisting of a circuit comprising a power rectifying circuit, a DC-AC inverter circuit, a switch which connects a commercial power with a load after an output voltage, frequency and phase of the DC-AC inverter circuit are coincided with respective corresponding characteristics of the commercial power and a switch which is opened after the aforementioned switch has been closed to interrupt the connection between the DC-AC inverting circuit and the load is disclosed. In the publication, DC is supplied to the DC-AC inverting circuit from the power rectifying circuit only.

Meanwhile, a power converting apparatus utilizing a solar array in input DC power of the DC-AC inverter is set force in Japanese Patent Laid-Open No. 70186/84. The power converting apparatus disclosed in the publication comprises the solar array, a DC-AC inverter means and a control circuit controlling the DC-AC inverter means so that maximum output can always be drawn out from the solar array. That is, in order to increase the efficiency of utilization of the solar array, so-called a maximum power operating point tracking control is effected. In the publication, a power source for the DC-AC inverter means is only supplied from the solar array. The apparatus is also set forth in U.S. Pat. Nos. 4,390,940; 4,404,472; 4,445,049.

Also, in Japanese Patent Laid-Open Nos. 170428/85 and 170429/85, a power generating apparatus utilizing the solar array is disclosed. In the aforementioned two publications, the power generating apparatus disclosed compries the solar array, inverter for converting DC power from the solar array into AC power, an induction motor connected to the AC output of the inverter and a fly wheel coupled to the induction motor. In the power generating apparatus in accordance with these publications, a surplus power generated by the solar array is stored in the fly wheel as kinetic energy.

In each patent and publication mentioned above, only one type of DC power is provided as the input DC power of the inverter. Thus, when the solar array is used as the DC power, since generated power from the solar array is normally fluctuating generation which largely fluctuates correlatively with the radiated intensity of the energy. For example, when a system utilizing the solar array in the aforementioned example of the related technique is used in the air conditioner, and the maximum power operating point tracking control is performed when the solar array can generate more power than necessary power for the inverter, difficulty is encountered to maintain the performance of the air conditioner.

SUMMARY OF THE INVENTION

The present invention is to provide a power converting apparatus which is able to restrain power consumption of the commercial power as much as possible, and to further utilize the generated power of a solar array effectively.

Thus, according to the present invention, a power converting apparatus is provided which comprises a solar array provided with a maximum power operating point tracking control, a DC-AC inverting means which converts a DC output inputted by the solar array into AC having a corresponding voltage and frequency and supplies an output thereof to a load, a commercial power which compensates an insufficient power when a generated power of the solar array is less than a consumed power of the load, a rectifying means which converts an AC output of the commercial power into a DC output and supplies that output to the DC-AC inverting means, and a regenerating means which regenerates a surplus power into the commercial power when the generated power of the solar array exceeds the consumed power of the load.

In the power converting apparatus in accordance with the present invention, when the generated voltage of the solar array exceeds necessary power of the load connected to the DC-AC inverting means, the surplus power is regenerated into the commercial power, also when the aforementioned generated power is less than the necessary power mentioned above, it is replenished by the power from the commercial power. Thus, due to the above operation, the operating voltage of the solar array is maintained always at a maximum power point and utilization factor of the solar array will be improved.

DETAILED DESCRIPTION OF THE PREFERRED EMBODIMENTS

Figure 1:
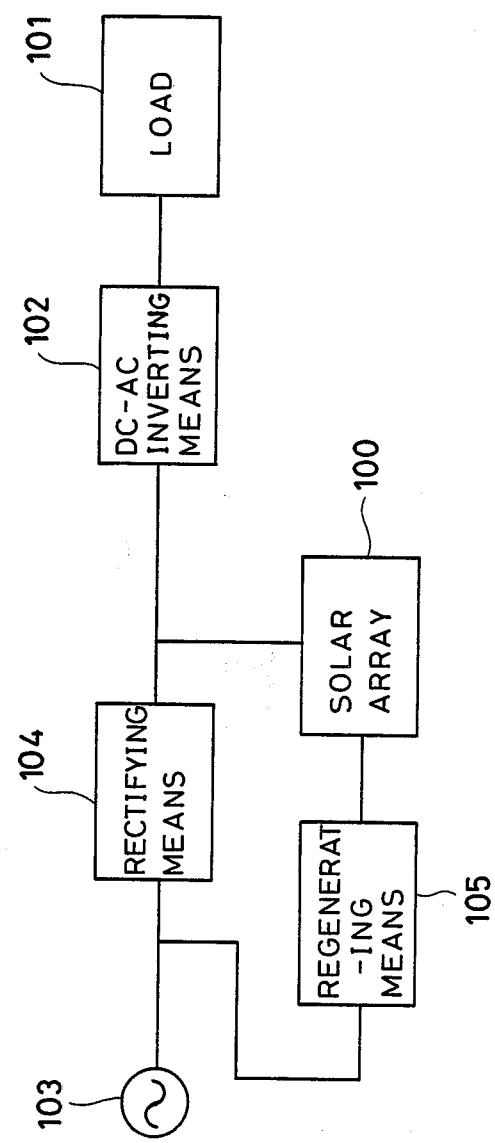
FIG. 1 is a block diagram showing an embodiment in accordance with the present invention.

Referring now to an embodiment of the present invention shown in the drawing in detail, FIG. 1 is a block diagram showing a constitution of one embodiment in accordance with the present invention.

A power converting apparatus in accordance with the present invention comprises a solar array 100 in which a maximum power operating point tracking control is performed electrically or mechanically so as to maximize the generated power constantly, a DC-AC inverting means 102 which converts the DC output inputted from the solar array into the AC having an arbitrary voltage and frequency and supplies the obtained AC output to a load 101, commercial power 103 which compensates an insufficient power when the generated power of the solar array 100 is less than consumed power of the load 101, a rectifying means 104 which converts the AC output inputted from the commercial power 103 into the DC output, and supplies it to the DC-AC inverting means 102, and a regenerating means 105 which operates when generated power of the solar array 100 exceeds consumed power of the load 101, and regenerates a surplus power which is a differential power between the generated power and the consumed power, into the commercial power 103.

As the solar array 100, the solar array comprising single crystal or the polycrystaline materials such as silicon, CdTe, GaAs and the like and, for example, amorphous materials such as amorphous silicone and the like may be used. The output capacity and rated voltage of the solar array 100 will be described on the integrated a-si solar array utilizing amorphous silicon and formed in a panel of $40 \times 120$ cm. The rated voltages is determined by the number of serially connected panels, for example, for obtaining the rated voltage of DC240 V, about 10 sheets of panels are connected in series. Furthermore, for example, for obtaining the output capacity of 2 Kw, a panel group consisting of panels connected serially in one unit as aforementioned are connected in parallel to achieve a total number of 120 panels. Thereby, the solar array having the output capacity of 2 Kw and the rated voltage of DC240 V may be obtained.

Figure 2:
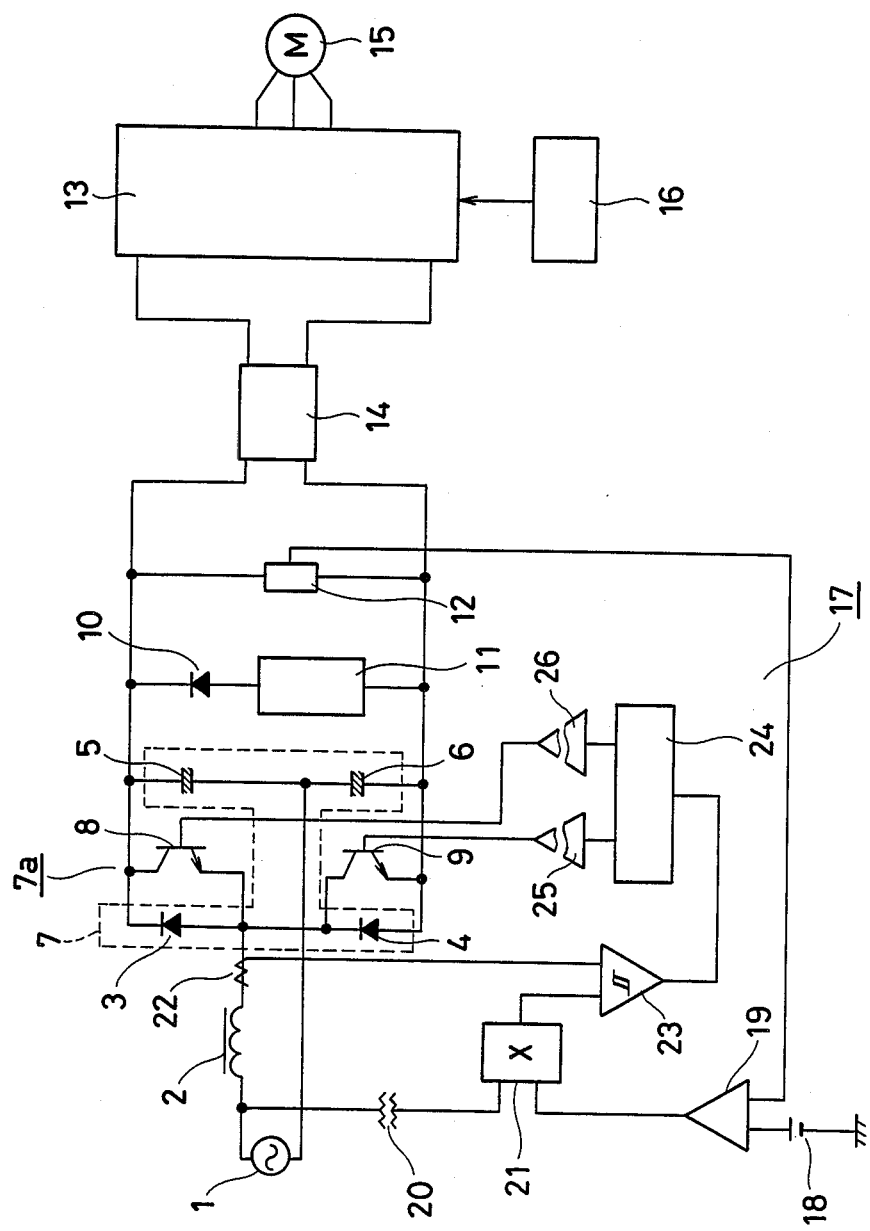
FIG. 2 is an electrical circuit diagram of the embodiment of FIG. 1 in accordance with the present invention.

Next, FIG. 2 shows a circuit diagram showing one embodiment of the power converting apparatus in accordance with the present invention and embodied in the air conditioner. The numeral 1 indicates a single-phase commercial power which is connected to rectifying means 7 comprising rectifying elements (hereinafter referred to as diodes) 3, 4 and capacitors 5, 6 via a reactor 2. The diodes 3, 4 and capacitors 5, 6 are connected for voltage double rectification of the single-phase commercial power 1, and function as intermediate DC power. Numerals 8 and 9 represent self-quenching type semiconductor switching elements such as bipolar transistors, gate turn-off thyristors, MOS-FET, SIT and the like (hereinafter referred to as transistors), and in the illustrated embodiment, two bipolar NPN transistors are used and connected to the diodes 3 and 4 in parallel, forming a voltage doubler rectifying circuit 7a with the rectifying means 7.

To the output end of the voltage doubler rectifying ciruit 7a, a solar array 11 is connected in parallel via a diode 10 blocking a flow of DC current from the voltage doubler rectifying circuit 7a, and a DC voltage detector 12 for detecting voltage fluctuation of the intermediate DC power is connected as well. The numeral 13 indicates a DC-AC inverting means (hereinafter referred to as inverter), whose input end is connected to the output end of the voltage doubler rectifying circuit 7a via a noise filter 14, and a motor 15 which is a load is connected to its output end. The motor 15 is used for a compressor of the air conditioner. The revolution per unit time of the motor 15 is controlled with an inverter control circuit 16 which adjusts the output voltage and frequency of the inverter 13 by receiving a command from an overall control portion (not shown) detecting the states of refrigeration cycle and heating and cooling load.

Next, a control circuit 17 with switching-controlling transistor 8 and 9 comprises the DC voltage detector 12 mentioned above. An error amplifier 19 supplied with the detected signal from the DC voltage detector 12 at one input and a DC reference voltage 18 at the other input. There is a multiplier 21 which multiplies the output signal of the error amplifier 19 and the AC voltage of the single-phase commercial power 1 reduced to a suitable signal level by a voltage transformer 20. A hysteresis comparator 23 compares the output signal of the multiplier 21 and the current brought to a suitable signal level by a current transformer 22 and flowing in and out of the voltage doubler rectifying circuit 7a. There is also a pulse forming circuit 24 which delays the output signal of the hysteresis comparator 23 by a prescribed time, and an isolation amplifier 25 and 26 which switches on and off respective transistors 8 and 9 so as to compensate each other with the signal from the pulse forming circuit 24.

The isolation amplifier 25 and 26 amplify ON/OFF signals outputted from the pulse forming circuit 24 to the power level which switches transistors 8 and 9 efficiently, and at the same time insulate the input and output electrically.

Figure 3:
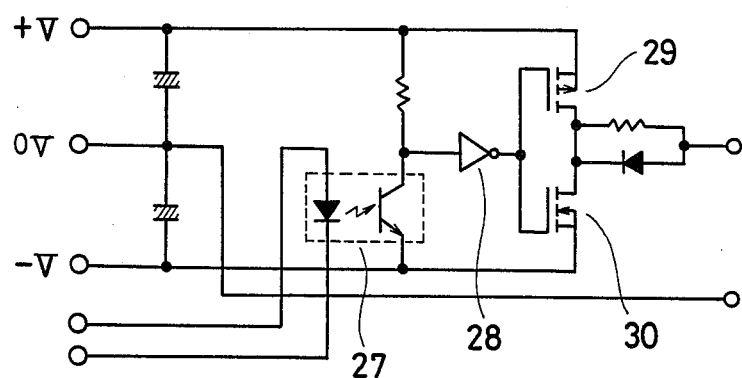
FIG. 3 is a circuit diagram of an isolation amplifier of the embodiment of FIG. 1.

FIG. 3 is a circuit diagram showing one specific example of the isolation amplifier. The output signal of the pulse forming circuit 24 is shaped and amplified to become the base signal of the transistors 8 and 9 by a circuit formed by a NOT gate 28, FETs 29 and 30 after being insulated electrically by a digital output type photocoupler 27.

Next, operation of the embodiment will be explained with reference to FIGS. 4 through 7.

First, a set value of the voltage value of the intermediate DC power supply will be explained. It is the first condition to set the set value approximately equal to one with optimum operating voltage where a maximum voltage is produced in the solar array 11. As the second condition, the set value must exceed double the peak value of the single-phase commercial power 1 (no-load voltage of the voltage doubler rectifying circuit 7a) necessary for regenerating a surplus power of the solar array 11 into the single-phase commercial power 1.

Figure 4:
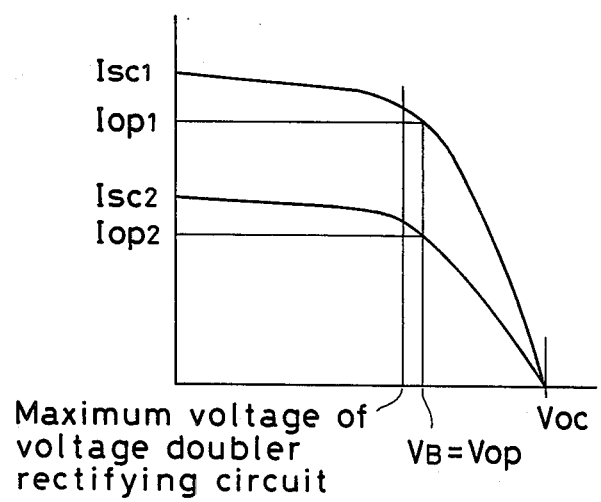
FIG. 4 is a graph showing relationship between voltage—current characteristics of a solar array and a voltage of an intermediate DC power supply.

FIG. 4 shows the relationship between voltage—current characteristics of the solar array 11 and the voltage of the intermediate DC power supply. If short-circuit current of the solar array 11 is indicated at $I_{sc1}$ and $I_{sc2}$ respectively for a good and bad intensity of reclined solar radiation, and if the open voltage of the solar array 11 is shown at Voc, an output characteristic is obtained as shown in the graph, in which a point indicated at Vop is maximum output operating point, and operating currents thereat are shown respectively at $I_{op1}$ and $I_{op2}$, which is already well known. Thus, conforming to the object of the present invention, the voltage of the intermediate DC power supply $V_B$ is coincided with the optimum operating voltage Vop of the solar array 11, and selected at about 320 V which is higher than the non-load voltage 310 V (in case of AC110 V) of the voltage doubler rectifying circuit 7a. Now, the error amplifier 19 compares the signal of the DC voltage detector 12 of the intermediate DC power supply and that of the DC reference voltage 18 corresponding to the set voltage of the voltage of the intermediate DC power supply, and outputs "0" output when both are equal, "+" output when the signal of the DC voltage detector 12 is smaller than that of the DC reference voltage 18, and reversely "−" output when greater.

Next, the multiplier 21 changes an inputted sine-wave voltage signal of the single-phase commercial power 1 reduced to suitable signal level by the voltage transformer 20, into a signal having polarity and amplitude corresponding to the signal level of the error amplifier 19 by multiplying it to the output signal of the error amplifier 19. The output of the multiplier 21 becomes a command signal of current control of the voltage doubler rectifying circuit 7a controlling current flowing through the single-phase commercial power 1 and the rectifying circuit. That is, when the voltage of the intermediate DC power supply $V_b$ is smaller than the set value, since the error amplifier 19 outputs a "+" output, the output of the multiplier 21 becomes a current command signal with the same phase as the voltage of the single-phase commercial power 1 via the pulse forming circuit 24 and isolation amplifiers 25 and 26 relative to the voltage doubler rectifying circuit 7a. This means that, "powering operation" for the feeding current having a power factor of 1.0 to the load side is commanded. Conversely, at a "−" output, "regenerating operation" for the feeding current having a power factor of −1.0 to the single phase commercial power 1 side is commanded. Also, at a "0" output, neither of aforementioned "powering operation" nor "regenerating operation" is commanded, thus no current flows between the single-phase commercial power 1 and the voltage doubler rectifying circuit 7a.

Figure 5:
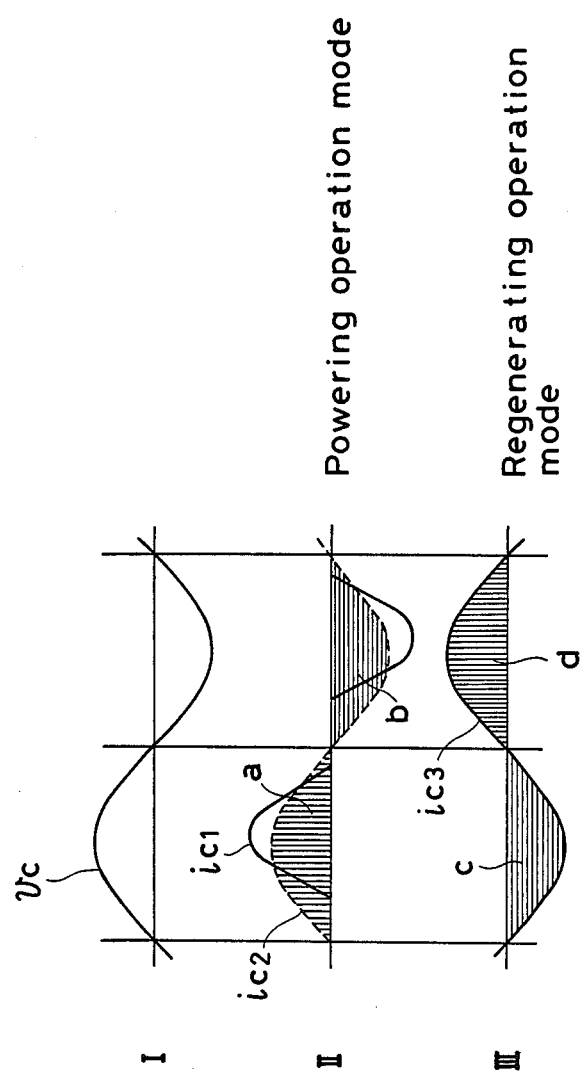
FIG. 5 is a waveform diagram showing the relationship between an operation mode and an operating waveform in the embodiment of FIG. 1.
Figure 6:
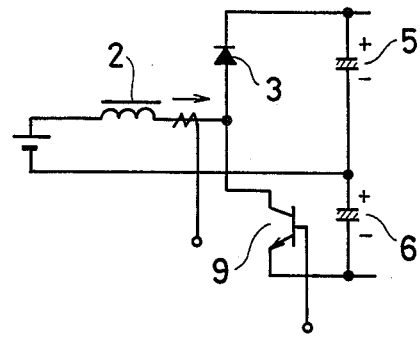
FIG. 6A, B and C, D respectively show electrical circuits of essential portions illustrating operation of voltage doubler rectifying circuits in powering and regenerating operations.
Figure 6:
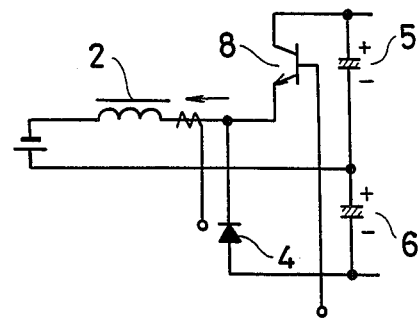
Figure 6:
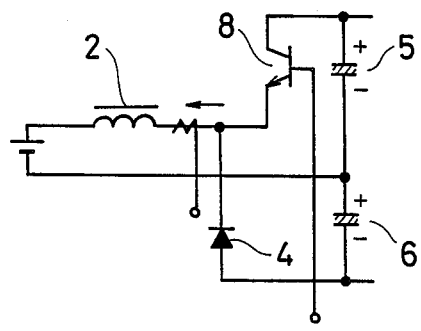
Figure 6:
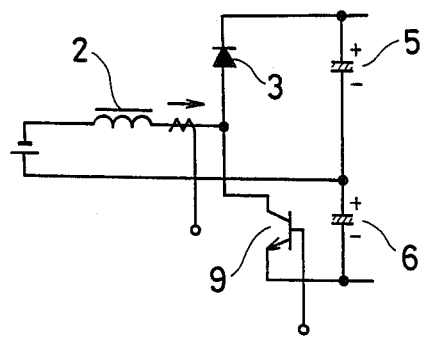

FIG. 5 is a waveform diagram showing the relationship between an operation mode and an operation waveform, in which I is the waveform of the voltage Vc of the single-phase commercial power 1, II is a current waveform of powering operation, wherein $i_{c2}$ is the current waveform of the embodiment and $i_{c1}$ is the conventional waveform, and III is the current waveform $i_{c3}$ at regenerating operation. Here, the combination of each positive and negative polarity of the commercial voltage and current is realized, and it may be considered on four types shown at a, b, c and d. In case of a, both the voltage and current are positive and power flows from the single-phase commercial power 1 to the load. Operation of the voltage doubler rectifying circuit 7a at this time is explained in FIG. 6A. That is, the voltage doubler rectifying circuit 7a operates as a booster chopper circuit comprising the reactor 2, transistor 9 and diode 3 in cooperation with the reactor 2. The operating state of the voltage doubler rectifying circuit 7a at b in FIG. 5 is shown in FIG. 6B, which operates as the booster chopper circuit comprising the reactor 2, transistor 8 and diode 4 as same as above. Furthermore in cases of c and d in FIG. 5, as respectively shown in FIGS. 6C and 6D, they operate as the dropper chopper circuits.

Chopper operation as aforementioned is effected with the signal obtained by comparing the current signal from the current transformer 22 and the current command value of the multiplier 21 by the hysteresis comparator 23.

Figure 7:
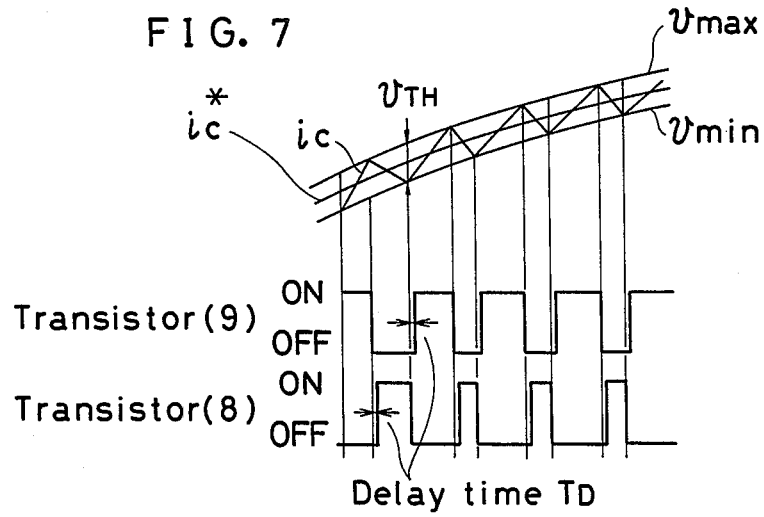
FIG. 7 is a graph illustrating operations of a hysteresis comparator and transistors.

FIG. 7 is a graph illustrating operations of the hysteresis comparator 23 and transistors 8 and 9, in which $i_c$* is the current command value which is the output of the multiplier 21, and $i_c$ is the operation current (current of the single-phase commercial power 1 of the voltage doubler rectifying circuit 7a transformed into a suitable signal level) which is the output of the current transformer 22. The hysteresis comparator 23 outputs a signal which has a width of Vth corresponding to the current command value $i_c$*, and switches ON the transistor 9 when the operation current $i_c$ reaches the minimum value Vmin, and switches OFF the transistor 9 when the maximum value Vmax is reached via the pulse forming circuit 24 and isolation amplifier 25. Also, the transistor 8 is controlled ON and off in the conduction state which compensates each other with the transistor 9.

These base signals of the respective transistors 8 and 9 at transition from OFF to ON, is outputted with the constant time delay against the pulse output of the hysteresis comparator 23. The delay is effected by the pulse forming circuit 24, and provided so that the transistors 8 and 9 are not turned ON simultaneously to short circuit the intermediate DC power supply. Thus, the pulse forming circuit 24 includes a delay circuit for producing the delay time $T_D$ (or the quiescent period).

As such, since the operating frequency of the voltage doubler rectifying circuit 7a having reversible operating function of power by performing switching operation, is selected in the high frequency range above 10 KHz, the current $i_c$ of the single-phase commercial power 1 flowing through the reactor 2 is a high quality waveform current without low frequency harmonics. Also, for the high frequency current, if the detecting width Vth of the hysteresis comparator 23 is selected smaller, special filtering means are not needed. When the high frequency current level is problematic, it can be readily suppressed by connecting a bypass capacitor (not shown) between the reactor 2 and the single-phase commercial power 1, that is, between AC input terminals.

Meanwhile, in the aforementioned embodiment, as it will be apparent from the above description, the regenerating means is formed by semiconductor switching elements 8, 9 and the control circuit 17.

Figure 8:
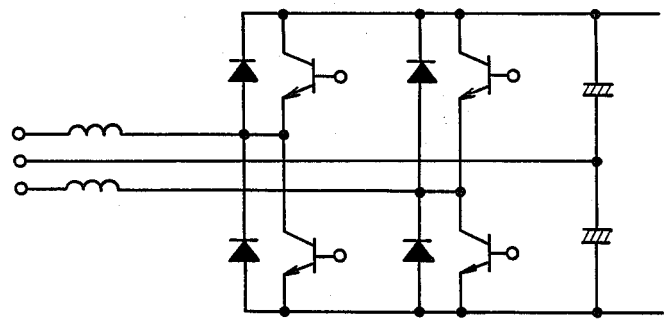
FIGS. 8 and 9 respectively show circuit diagrams of rectifying means in the case of single-phase three-wire system and three-phase commercial powers.
Figure 9:
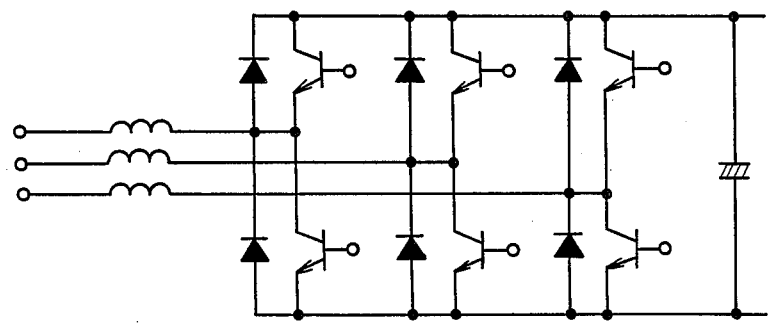

Also, in the embodiment mentioned above, though the power converting apparatus for the single-phase commercial power has been described, in case of the single-phase three-wire and three-phase commercial powers, as shown in FIGS. 8 and 9, the rectifying means may be constructed of an all-wave rectifying circuit corresponding to each power source, that is, the single-phase three-wire and three-phase system. Also, since semiconductor switching elements are disposed corresponding to the number of rectifying elements of respective all-wave rectifying circuits, control circuits are added corresponding to the number of semiconductor switching elements.

As it will be apparent from the above explanation, the power converting apparatus of the embodiment is able to supply the power to the load easily by connecting the commercial power to the solar array in parallel via the voltage doubler rectifying circuit having a reversible operating function of the power flow, thus the power supply from the single-phase commercial power can be reduced. Also, the current of the commercial power is always maintained at a high power factor and a low distortion factor, so that the electrical system is free from any fault.

Figure 10:
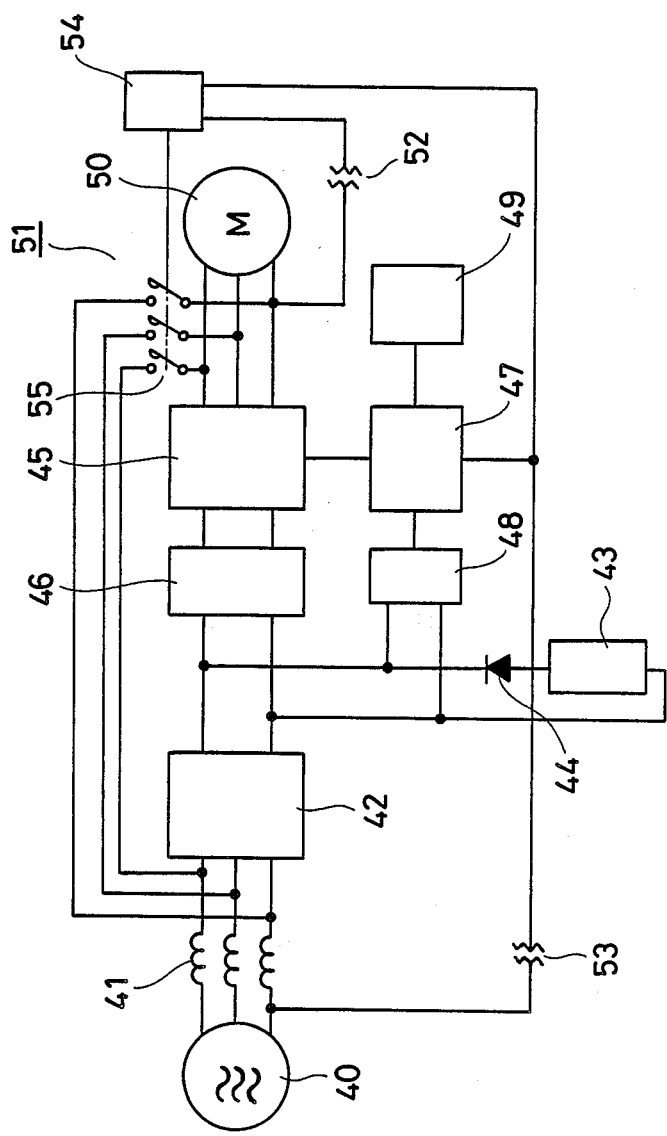
FIG. 10 is an electrical circuit diagram of another embodiment in accordance with the present invention.

Next, another embodiment in accordance with the present invention will be explained. A circuit diagram shown in FIG. 10 is for an air conditioner, in which the numeral 40 is a commercial power, which is a three-phase system in this embodiment and connected to a rectifying means 42 via a reactor 41. The rectifying means 42 is a three-phase all-wave rectifying circuit constituted by, for example, diodes. The commercial power 40 is rectified and smoothed by the rectifying means 42 to become an intermediate DC power supply. The reactor 41 is provided to restrain the input current waveform having a narrow flow angle and a high peak value which are features of a capacitor input rectifying circuit, and to improve the power factor.

The numeral 43 represents a solar array which is connected to the intermediate DC power supply in parallel via a diode 44 impeding the flow of DC current from the rectifying means 42. The solar array 43 has the optimum operating voltage where the output power is maximized due to its voltage and current characteristics. The optimum operating voltage is adjustable by the number of serial connected cells in the constitution of the solar array, and selected approximately as same as the voltage value of the intermediate DC power supply. The numeral 45 is an inverter which is connected to the rectifying means 42 via a noise filter 46. The inverter 45 and the noise filter 46 may be of the conventional type. The output power of the inverter 45 is controlled by an inverter control circuit 47. To the inverter control circuit 47 are connected a voltage detector 48 detecting a generated voltage fluctuation of the solar array 43, and an air conditioning control circuit 49 commanding the output frequency of the inverter 45 corresponding to the required refrigerating capacity of the air conditioner. The numeral 50 indicates a compressor motor which is a load and connected to the output end of the inverter 45. The numeral 51 is a regenerating means comprising a voltage transformer 52 transforming the output voltage of the inverter 45. The voltage transformer 53 is provided for transforming the output voltage of the commercial power 40 and a synchronous detecting circuit 54 is connected with the voltage transformer 52 and 53 for comparing respective output voltage and frequency of the inverter 45 and commercial power 40. A switch 55 closes to connect the ouput end of the inverter 45 and the input end of the rectifying means 42 when the synchronous detecting circuit 54 has detected that respective output voltage and frequency of the inverter 45 and commercial power 40 are synchronized.

Next, referring to FIGS. 11 through 13, operation of the embodiment of FIG. 10 will be explained. The voltage value of the intermediate DC power supply is more or less determined by the voltage of the commercial power, when the solar array 43 is not generating and when the power is supplied to the inverter 45 from both the solar array 43 and the commercial power.

An input power of the inverter 45 is determined by the power required by a motor 50 of a compressor which is a load according to the operating state of the air conditioner. Thus, when generated power of the solar array 43 exceeds the required amount, there is no power supply from the commercial power 40, the voltage of the intermediate DC power supply is determined only by the inverter input power and the characteristics of the solar array 43.

Figure 11:
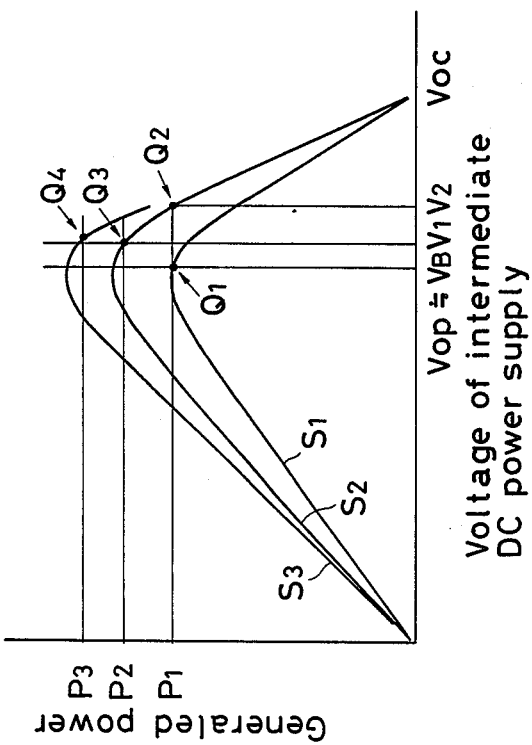
FIG. 11 is a graph similarly showing the relationship between output characteristics of the solar array and the voltage of intermediate DC power supply.

FIG. 11 shows the relationship between the output characteristic of the solar array 43 and the voltage of the intermediate DC power supply. $V_B$ is the voltage value of the intermediate DC power supply at the supplying state with the commercial power 40 only, or at the co-supplying state with both the commercial power 40 and the solar array 43. The optimum operating voltage Vop of the solar array 43 is designed more or less same as the co-supply voltage $V_B$. Voc is the open voltage of the solar array 43. Now, if an input power of the inverter 45 is represented by $P_1$, an output power of the solar array 43 is Q1, since a DC operating point is the co-supply voltage $V_B$ when the output characteristic of the solar array 43 is a curve $S_1$. However, when the intensity of radiation is increased and the output power characteristic of the solar array 43 shows a curve $S_2$, the DC operating point voltage shows the operating voltage $V_2$, a point where the output power is same as $P_1$, thus it comes off the optimum operating voltage Vop and shows a higher voltage. The voltage detector 48 detects the voltage value of the intermediate DC power supply and comprises a hysteresis comparator, which outputs signal "H" when the voltage value exceeds the set voltage $V_1$ set slightly higher than the co-supply voltage $V_B$, and outputs signal "L" when it is less than the co-supply voltage $V_B$.

When the output signal of the voltage detector 48 becomes "H", that is, the state where the solar array 43 is generating a surplus power more than the required power value of the air conditioning function at that time, the inverter control circuit 47 raises the output frequency of the inverter 45 for increasing the intermediate DC power output (input of the inverter 45), if the output frequency of the inverter 45 is less than the commercial frequency. Even when the output of the inverter 45 reaches the commercial power frequency, if the output signal of the voltage detector 48 is at the state of "H", the switch 55 is closed to connect the output end of the inverter 45 to the commercial power 40 directly. Thereby, the inverter control circuit 47 increases output power of the inverter 45 so as to drop the voltage value of the intermediate DC power supply to the set voltage $V_2$. In this case, though the output frequency of the inverter 45 corresponding to the necessary refrigerating capacity of the air conditioner is commanded from the air conditioning control circuit 49, if the signal "H" is outputted from the voltage detector 48, having priority over the frequency command from the air conditioning control circuit 49, the inverter control circuit 47 raises the output frequency of the inverter 45 to approach to the commercial power frequency. The voltage transformers 42, 43 respectively reduce the commercial power 40 and inverter output voltage to the signal level of the synchronous detecting circuit 44 to input thereto.

Here, the switch 45 is turned on after the synchronous detecting circuit 44 has confirmed that the inverter output is phase synchronized with the commercial power voltage, and the surplus power is regenerated into the commercial power 40. When the output frequency of the inverter 45 is coincided with the commercial power 40, the revolutions per unit time of the motor 50 becomes constant and the inverter output is constrained by the commercial power voltage. As it will be apparent from the above, increasing the inverter output voltage is consequently reducing the voltage of the intermediate DC power supply.

Figure 12:
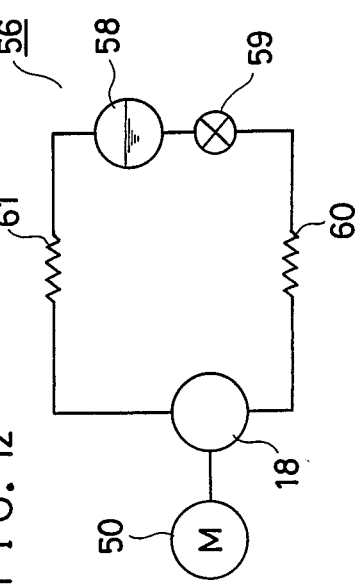
FIG. 12 is a block diagram similarly showing a constitution of a refrigeration cycle unit within an air conditioner.

FIG. 12 shows a refrigerating cycle apparatus 56 of the air conditioner of the embodiment. The compressor 57 is designed to exhibit a prescribed ability at the motor driving frequency of 15 Hz–60 Hz.

Referring to FIG. 11, the operation will be more specifically described. A point $Q_1$, is the case of intensity of radiation $S_1$ where a generated power of the solar array 43 is coincided with an inverter input power, wherein the voltage of the intermediate DC power supply show the co-supply voltage $V_B$. When the intensity of radiation is changed and the output characteristic of the solar array 43 changes to a curve $S_2$, assuming that the inverter input stays as it is, the voltage of the intermediate DC power supply rises to $V_2$, since the signal "H" is outputted by the voltage detector 48, then the inverter control circuit 47 increases the output frequency to increase the inverter output (or input) and to reduce the voltage of the intermediate DC power supply. When the voltage of the intermediate DC power supply drops to the co-supply voltage $V_B$, the voltage detector 48 outputs the signal "L", then reversely, it operates to drop the inverter output, thus the voltage of the intermediate DC power supply is raised. Thus, the voltage of the intermediate DC power supply reciprocates between the co-supply voltage $V_B$ and the set voltage $V_a$ on FIG. 11, while the inverter control circuit 47 substantially balances the generated power of the solar array 43 and the inverter input (output voltage and frequency control).

However, when the intensity of radiation increases further so that the output characteristic of the solar array 43 shows a curve $S_3$, the inverter output frequency reaches the maximum frequency of the commercial power frequency, above which the inverter input power can not be increased.

Figure 13:
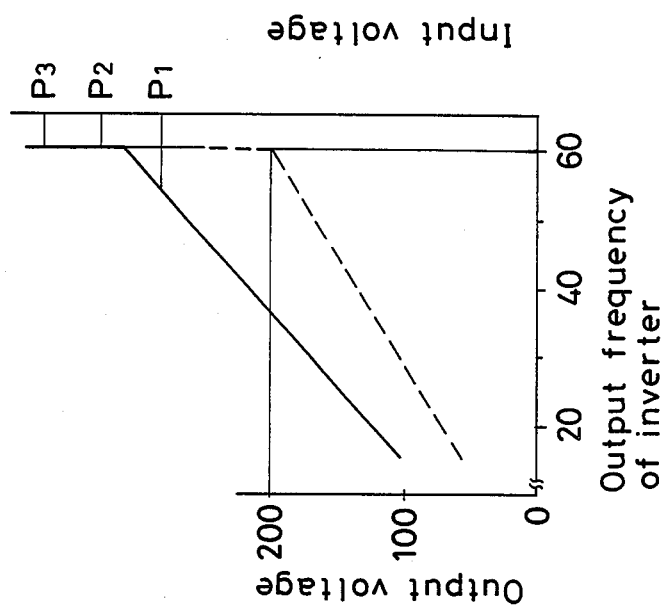
FIG. 13 is a graph similarly showing operating characteristics of an inverter means.

FIG. 13 shows operating characteristics of the inverter 45, in which an input power increases more or less in proportion to the frequency due to the load characteristic of the compressor 57 as shown in the solid line. Also, the output voltage of the inverter 45 shows the operating characterisitc proportional to the frequency below 60 Hz as shown in the broken line. Even when reaching 60 Hz, if there is a command to increase the inverter input (the output of voltage detector 48 is "H"), as previously described, after synchronization, the inverter 45 is operated in parallel with the commercial power 40 to increase the output voltage only. The broken line in FIG. 13 shows when the parallel connection is not effected, but when the parallel connection is made, the inverter output voltage is constrained by the commercial power voltage and power regeneration is effected.

In the above operation, a problem is that the air conditioner is operated at a greater speed different from that required by the compressor 57, resulting in an excessive refrigerating capacity.

In another embodiment as shown in FIG. 12, in order to solve the problem, a receiver tank 58 is disposed in the refrigerating cycle apparatus 56. That is, a buffer function corresponding to a surplus or an insufficient power capacity produced according to the generated power capacity of the solar array 43, refrigerating capacity and using condition is added.

In FIG. 12, numerals 59, 60 and 61 respectively indicates a valve, evaporator and condenser, which are all well known.

As it will be apparent from above, the power converting apparatus of the embodiment of FIG. 12 is designed to detect the surplus power easily and to perform the regenerating operation accurately by the fact that, the inverter output frequency has increased to the commercial frequency and the voltage of the intermediate DC power supply has exceeded the constant value.

Also, even if the solar array generates more than necessary power of the compressor, the generating efficiency of the solar array is not reduced, utilizing all power effectively. Thus, when the apparatus applied in the air conditioner, the solar array capacity more than the rating of the compressor may be installed, reducing the demand power at peak generation. Moreover, if the receiver tank capacity is suitably designed, the generated power during the day time can be stored in the state of refrigerant, which can be utilized for cooling at night.

Also, from aforementioned descriptions of each embodiment, following points can be easily understood.

The generating effect of the solar array is highly maintained by controlling intermediate DC power at the constant voltage. Besides, in relationship between generated power of the solar array and the power consumed by the load, when excess or shortage is occurred therebetween, the intermediate DC power supply is utilized effectively, improving the utilization factor of the solar array.

Meanwhile, in the above respective embodiments, the power converting apparatus embodied in the air conditioner has been described, it will be appreciated that the power converting apparatus in accordance with the present invention is applicable to all systems and facilities where the motor has to be variably controlled.

What is claimed is:

1. A power converting apparatus comprising
  a solar array provided with maximum power operating point tracking control;
  DC-AC inverting means for converting a DC output voltage from the solar array into AC having a controlled voltage and frequency, and supplies an output thereof to a load;
  a commercial power source which compensates an insufficient power when a generated power of the solar array is less than the consumed power of the load;
  rectifying means which converts an AC voltage supplied by the commercial power source into a DC output and supplies that output to said DC-AC inverting means; and
  regenerating means which regenerates a surplus power into the commercial power source when the generated power of the solar array exceeds the consumed power of the load.

2. A power converting apparatus in accordance with claim 1, wherein the rectifying means comprises a plurality of rectifying elements and the regenerating means comprises a plurality of semiconductor switching elements respectively connected in parallel to the plurality of rectifying elements, and a control circuit which controls the semiconductor switching elements so as to retain the output voltage of the rectifying means at a constant value.

3. A power converting apparatus in accordance with claim 2,
  wherein the control circuit comprises a DC voltage detector which detects fluctuations of the generated voltage of the solar array; an error amplifier which compares the detected signal outputted from the DC voltage detector and a DC reference voltage set in advance to produce output signals in three different states corresponding to the operated results; a multiplier which multiplies the output signal of the error amplifier and the AC voltage of the commercial power reduced to a suitable signal level; a hysteresis comparator which compares the output signal of the multiplier with the current flowing in and out of the rectifying means and transformed into a suitable signal level; a pulse forming circuit which delays the output signal of the hysteresis comparator by a prescribed time and isolation amplifier means which amplifies the signal outputted successively at a prescribed interval by the pulse forming circuit to successively turn ON and OFF respective semiconductor switching elements.

4. A power converting apparatus in accordance with claim 2, wherein the plurality of semiconductor switching elements are semi-conductor switching elements having self-quenching ability.

5. A power converting apparatus in accordance with claim 1, wherein the regenerating means comprises a first transformer which transforms the output voltage of the DC-AC inverting means into a suitable signal level; a second transformer which transform the output voltage of the commercial power into a suitable signal level; a synchronous detecting circuit which compares respective output voltage and frequencies of the DC-AC inverting means and the commercial power by respective output voltage of the first and second transformers; and a switch means operated by the output signals of the synchronous detecting circuit, outputted when respective output voltages and frequencies of the DC-AC inverting means and the commercial power are synchronized, to connect the output end of the DC-AC inverting means to the commercial power.

* * * * *